United States Patent [19]
Kojima et al.

[11] Patent Number: 5,178,366
[45] Date of Patent: Jan. 12, 1993

[54] VALVE SEAL

[75] Inventors: Tetsuya Kojima; Masahiko Nakazawa; Hisayoshi Matsumoto; Yoshinori Shimomura, all of Osaka, Japan

[73] Assignee: Masako Kiyohara, Kumamoto, Japan

[21] Appl. No.: 832,343

[22] Filed: Feb. 7, 1992

[30] Foreign Application Priority Data

Feb. 20, 1991 [JP] Japan .................. 3-049150

[51] Int. Cl.⁵ ................ F16K 31/00; F16K 25/00
[52] U.S. Cl. .................... 251/335.2; 251/174; 251/176; 251/356; 251/359; 251/368
[58] Field of Search ............. 251/335.3, 359, 356, 251/368, 174, 176, 335.2

[56] References Cited

U.S. PATENT DOCUMENTS

| 1,427,680 | 8/1922 | English ........................... 251/359 |
| 1,527,154 | 2/1925 | Mallory et al. ................ 251/335.3 |
| 2,402,950 | 7/1946 | Culver et al. .................... 251/359 |
| 2,519,541 | 8/1950 | Bryant ............................ 251/359 |
| 4,126,295 | 11/1978 | Natalizia ....................... 251/368 |

FOREIGN PATENT DOCUMENTS 12461 of 1905 United Kingdom ............ 251/356

Primary Examiner—A. Michael Chambers
Attorney, Agent, or Firm—Griffin Butler Whisenhunt & Kurtossy

[57] ABSTRACT

A fluid flow control valve is provided with a seal comprising a thin metallic film backed by a resiliently deformable body. The seal is mounted on a closure part which may be either the valve stem or the valve seat. The thin film and deformable body are deformed so as to conform to the surface the metallic film seals against as the valve is closed. As the valve is opened, the deformable body returns to its initial state thus returning the thin film to its initial state.

10 Claims, 3 Drawing Sheets

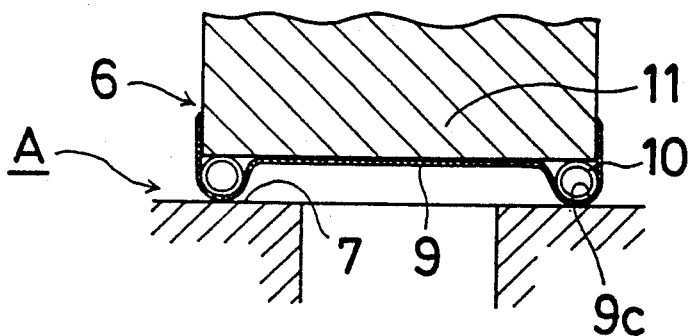
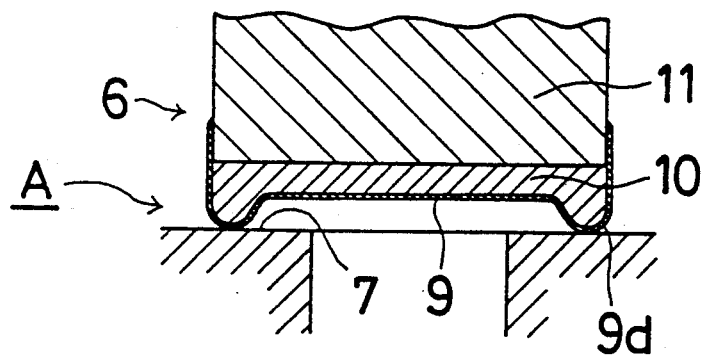
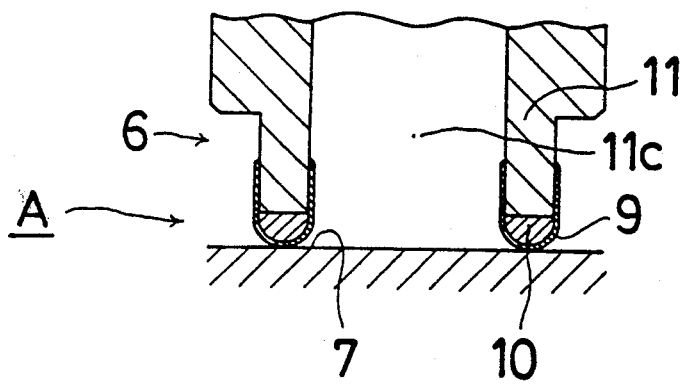

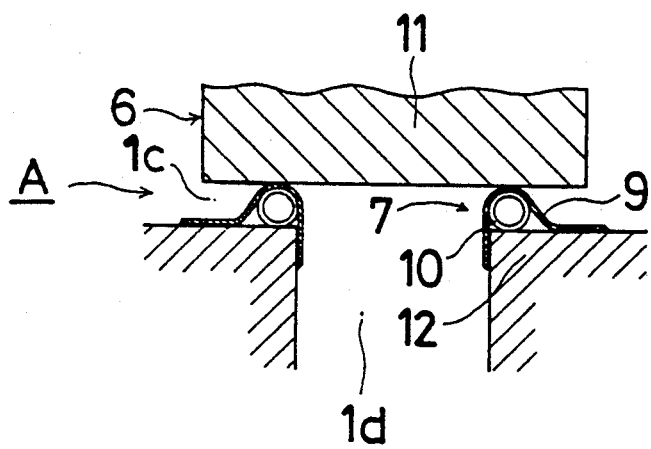
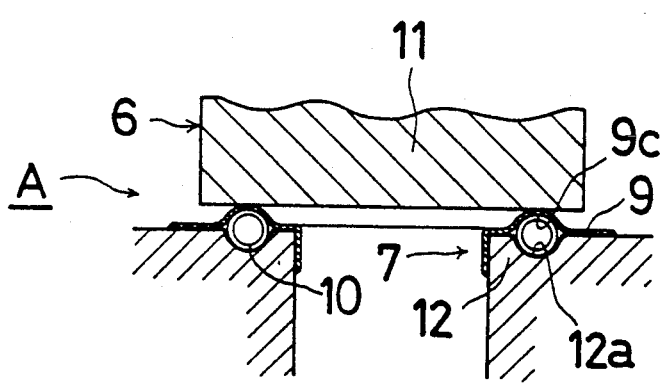
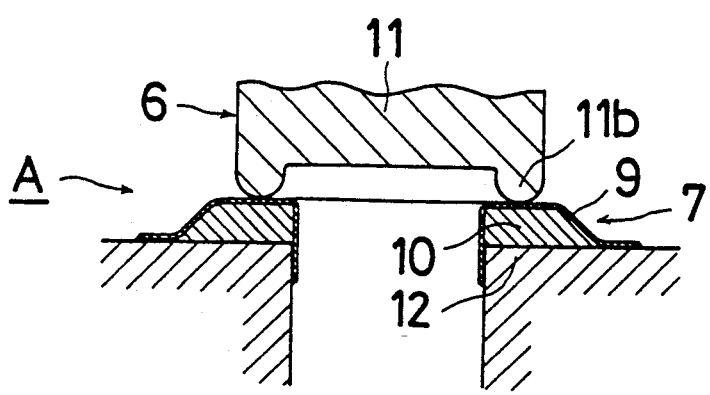
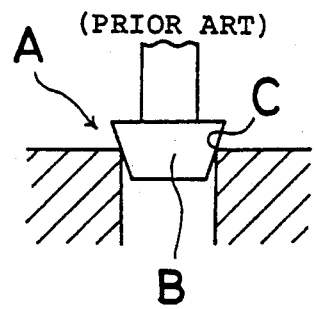
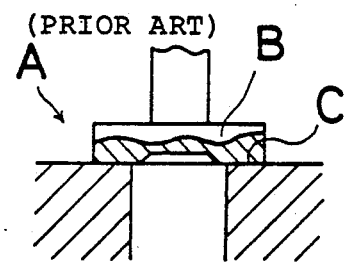
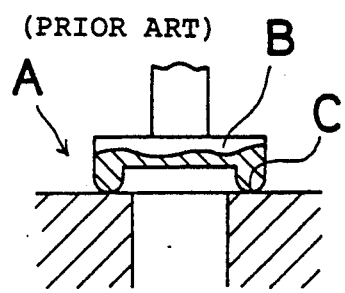

VALVE SEAL

This invention to a fluid flow control assembly or valve suitable for use in equipment for manufacturing semiconductors, vacuum equipment, medicine and food manufacturing equipment and the like. More particularly, the present invention relates to a valve seal arrangement providing a seal between the closure parts of the valve.

Closure parts in valves of the prior art have generally utilized metal-to-metal or metal-to-resin contact to prevent flow of fluid through the valves when they are closed. Metal-to-resin contact has been used extensively in equipment for manufacturing semiconductors, medicine and food products. However, the use of metal-to-resin contact to obtain a fluid seal involves a number of problems.

In a valve closure wherein the sealing is accomplished by metal-to-resin contact it has been necessary to affix the resin part to metal, for example, to a metal stem or metal disc. This creates a narrow gap or recess from which it is extremely difficult to remove gas. Furthermore, the resin itself contains gaseous components. Thus, when the valve is used in vacuum equipment it prolongs the time required to reach a given degree of vacuum and, over a period of time, the degree of vacuum is reduced unless the vacuum source is maintained. The surface area of the resin has been reduced and improved resin materials have been developed but these attempts to solve the problem have not been entirely successful.

While metal-to-metal closures do not present the same problem as metal-to-resin closures, there are problems in using present metal-to-metal closures. When one of the closure parts is conical in shape as shown in FIG. 9, the movable valve closure part slides against the valve seat thus producing pulverized metal particles which enter the stream of fluid passing through the valve. In a flat type closure as shown in FIG. 10, the sealing performance is very low. In a protruding type closure as illustrated in FIG. 11, crushing, denting or flaking is likely to occur where the valve body contacts the seating surface. This causes metal particles to be introduced into the fluid stream and also reduces the sealing capability of the closure.

There are various ways in which the sealing capabilities may be improved in a valve having a metal-to-metal closure. The sealing surfaces may be more accurately machined. Soft metal may be used. The closing pressure may be increased. However, each of these solutions has restrictions such as increased machining costs, production of metal particles and crushing and deformation of the closure parts.

SUMMARY OF THE INVENTION

An object of the present invention is to provide a fluid flow control assembly having first and second closure parts for shutting off fluid flow through the assembly, the fluid flow control assembly being characterized in that the contact surface of one of the closure parts comprises a metallic film backed by a resiliently deformable body.

Another object of the invention is to provide a fluid flow control valve having a valve seat and a valve stem which cooperates with the valve seat to block fluid flow through the valve, the valve being characterized in that a metallic film is attached to either the valve stem or the valve seat and a resiliently deformable body is provided between the metallic film and the stem or seat to which it is attached.

A further object of the invention is to provide a metal-to-metal seal between two closure parts of a valve, the seal being deformable to the configuration of the closure part surface which it contacts as the valve is closed and resilient so that it returns its initial shape when the valve is opened.

In accordance with the principles of the present invention, a flow control valve having first and second closure parts for selectively shutting off fluid flow through the valve is provided with a fluid seal in the form of a metallic thin film. The thin film is mounted on one of the closure parts and a resiliently deformable body is positioned between the thin film and the closure part on which it is mounted. The closure part may be the valve seat or the valve stem, disc or other closure body. The thin film and the deformable body may have a variety of shapes depending upon the configurations of the closure parts.

Other objects and advantages of the invention will become apparent upon consideration of the following description and the accompanying drawings.

BRIEF DESCRIPTION OF THE DRAWINGS

FIG. 3 is a sectional view illustrating a third embodiment of the invention;

FIG. 4 is a sectional view illustrating a fourth embodiment of the invention;

FIG. 5 is a sectional view illustrating a fifth embodiment of the invention;

FIG. 6 is a sectional view illustrating a sixth embodiment of the invention;

FIG. 7 is a sectional view illustrating a seventh embodiment of the invention;

FIG. 8 is a sectional view illustrating an eighth embodiment of the invention; and, FIGS. 9-11 are sectional views illustrating first, second, and third embodiments of prior art valve closure parts.

DETAILED DESCRIPTION OF THE INVENTION

Figure 1:
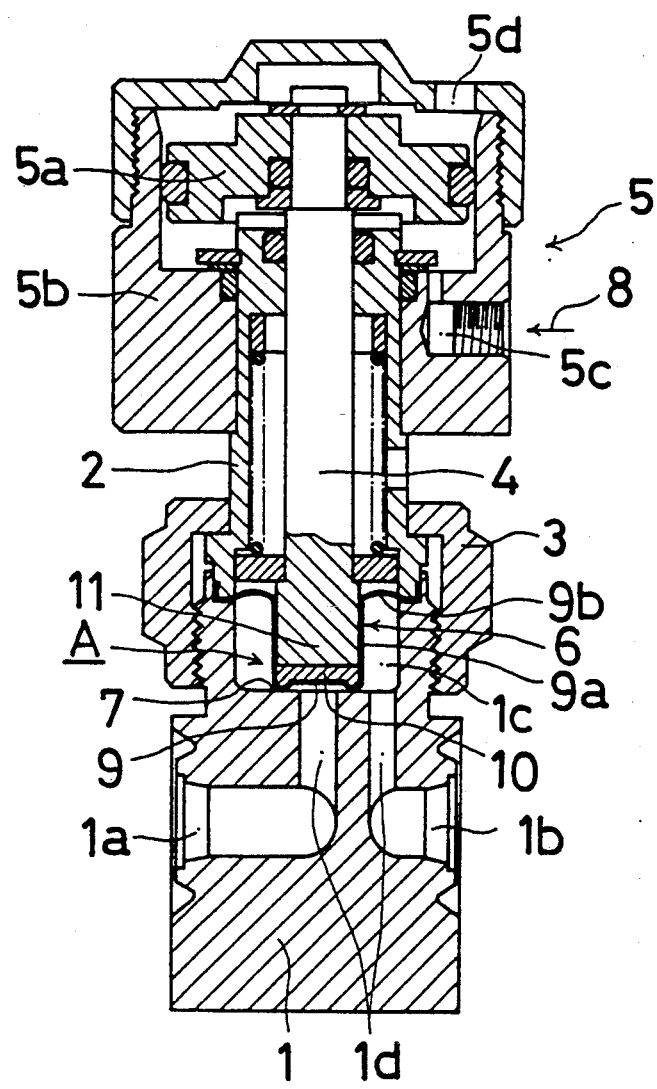
FIG. 1 is a sectional view of a fluid controller including a seal constructed in accordance with a first embodiment of the invention.

FIG. 1 illustrates a fluid flow controller or valve of the prior art having therein a seal A constructed in accordance with the principles of the present invention. The valve comprises a valve body 1 having formed therein a fluid inlet 1a, a fluid outlet 1b, a valve chamber 1c and two fluid flow passages 1d connecting the chamber 1c with the inlet 1a and outlet 1b. A cover 2 is mounted on valve body 1 and forms the upper wall of valve chamber 1c. A nut 3 tightly secures cover 2 on the valve body 1.

The lower portion of a slidable valve stem 4 extends through cover 2 and nut 3 into the valve chamber 1c while the upper portion of the valve stem extends into a cylinder chamber provided in the cylinder 5b of a hydraulic drive unit 5. The upper end of valve stem 4 is attached to a drive piston 5a. The cylinder 5b is provided with a first fluid inlet 5c through which fluid 8 may be applied to drive piston 5a and valve stem 4 upwardly. The cylinder 5b has a second fluid inlet 5d to which fluid may be applied to drive piston 5a and valve stem 4 downwardly.

The lower end portion 11 of valve stem 4 serves as a first closure part 6 of the valve and a seating surface 7 of valve body 1 serves as the second closure part. In accordance with a first embodiment of the present invention, seal A comprises a thin metal film 9 and a resiliently flexible or deformable cushion body 10. The thin metal film 9 may be formed, for example, by electrodeposition or by pressing a film of nickel or nickel alloy so as to have a cylindrical hollow portion 9a for receiving the lower portion 11 of the valve stem, and a rib section 9b, the circumferential edge of which is clamped between the valve body 1 and valve cover 2. Thus, in this embodiment the thin metallic film cooperates with valve body 1 to form a completely enclosed chamber.

The deformable body 10 provides a backing for thin film 9 and is positioned between the thin film and the lower surface of the lower portion 11 of the valve stem. The body 10 is formed from a material or part which maintains appropriate elasticity and flexibility such as, for example, rubber, synthetic resin or a coil spring. In FIG. 1, the body 10 is in the form of a disc and may be made of fluoro-rubber.

The deformable body 10 need not be preformed. It may be formed in-situ by pouring or injecting a liquid resin into the space between the lower surface of valve stem 4 and the thin film 9.

The thin metal film 9 shown in FIG. 1 has a downwardly extending circular ridge which contacts the seating surface 7 and prevents the flow of fluid into chamber 16 from fluid inlet 1a when the valve is closed. As the valve stem 4 is forced downwardly by the drive unit 5, the thin film 9 contacts the surface of valve seat 7. Then, as the valve stem 4 is further lowered by a small distance, the elasticity of the deformable body 10 allows the thin film 9 to be yieldingly pressed in a slightly deformed condition against the valve seat. Because the thin film is thin, it closely contacts and conforms to the seating surface thus providing a tight closure. Because the thin film is resiliently pressed against the seating surface, there is little likelihood that the thin film or the seating surface will be dented or pulverized particles of the film or seat surface produced by frictional wear.

When the valve is opened by moving stem 4 upwardly, fluid flows from inlet 1a into chamber 1c between the thin film 9 and seating surface 7, and then flows out of the chamber through outlet 1b. As the valve stem is moved upwardly, the resiliency of the deformable body 10 causes it to return to its initial state and as it does, it restores the thin film 9 to its initial state.

It will be understood that the fluid controller shown in FIG. 1 is for purposes of illustrating application of the invention to prior art structures. The seal may be incorporated into other types of fluid controllers such as relief, check or pressure-reducing valves. The form or shape of the thin film 9 or the deformable body 10 may take various forms depending on the structure of the valve in which they are used.

Figure 2:
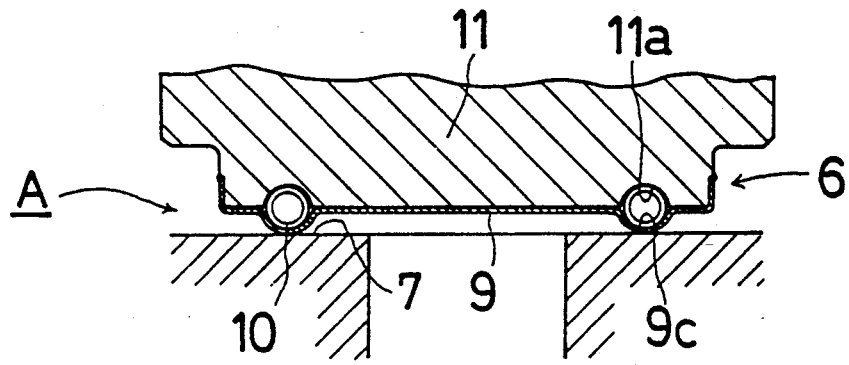
FIG. 2 is a sectional view illustrating a second embodiment of the invention.

FIG. 2 illustrates a second embodiment of the seal wherein the deformable cushion body 10 comprises a coil spring and the thin film 9 is disk-shaped with an upwardly extending rib surrounding the lower portion 11 of the valve stem. The bottom surface of lower portion 11 of the valve stem is provided with an annular semi-circular recess 11a and the thin film 9 is shaped to have a matching semi-circular groove 9c, the spring being positioned in the recess 11a and the groove 9c. The circumferential edge of thin film 9 is welded to the external surface of the lower portion 11 of the valve stem.

The embodiment shown in FIG. 3 is similar to the embodiment shown in FIG. 2. However, in the FIG. 3 embodiment the groove 9c provided in the thin film 9 is made deep enough to accommodate the coil spring 10 and no groove is provided on the lower surface of the valve stem.

In the embodiment shown in FIG. 4, the deformable body comprises a rubber or the like elastomer which fills the space between the thin film 9 and the bottom of the valve stem. The thin film 9 is disk-shaped with a downwardly depending rib 9d for contacting the seating surface 7. The thin film has an upwardly extending circumferential rim which surrounds the lower part of the valve stem and is welded thereto.

The embodiment illustrated in FIG. 5 is intended for use in a valve where a fluid inlet or outlet passage 11a extends through the lower portion 11 of the valve stem and is selectively sealed off from the valve chamber 1c (FIG. 1) by the seal. The thin film is in the form of an annulus having a U-shaped cross-section with the legs of the U extending upwardly along the internal and external surfaces of the annular portion of the valve stem surrounding passage 11a. The thin film is welded to the external surface of the valve stem. The deformable body 10 may be rubber or the like elastomer.

In the embodiments previously described, the seal is located on the movable closure part, that is, on the valve stem. However, the seal may also be located on a fixed closure part, such as the valve body, in the region of the seating surface 7. FIGS. 6-8 show different arrangements of the seal when it is mounted on the valve body surrounding fluid flow passage 1d.

In FIG. 6, the deformable body 10 is annular in shape and comprises a coil spring which rests on the surface of the valve body surrounding the fluid flow passage 1d. The thin metal film 9 covers the spring and is welded to upper portion 12 of the valve body. The thin film has a vertically extending portion which extends downwardly into the fluid flow passage 1d.

The embodiment shown in FIG. 7 is similar to the FIG. 6 embodiment except that the valve body is provided with an annular groove 12a having a semi-circular cross-section for receiving the spring.

In the embodiment of FIG. 8, the deformable body 10 comprises a generally flat disc made of a resilient filler material such as rubber and the thin film 9 is annular in shape. The thin film completely covers the deformable body and extends downwardly into the fluid passage. The thin film is welded to the upper portion 12 of the valve body. The lower surface of the closure member 6, that is, the valve stem, is provided with a downwardly depending ring-like projection 11b which makes sealing contact with the upper surface of the thin film 9.

From the foregoing description it is evident that the novel sealing arrangement offers many advantages over prior art valve closure elements. Because the thin film yieldingly contacts the opposing closure part, the contacting surfaces are not damaged and frictional wear is kept to a minimum so that metal particles are not introduced into the fluid stream being controlled. Even though the deformable body 10 may comprise a material which discharges gas, the thin film will contain gas even under a vacuum. This is particularly true when the thin film is welded to a closure part around the entire periphery of the film.

The novel sealing arrangement also improves gas substitution performance and permits use of wide variety of materials as the deformable body because it eliminates the metal-resin joint gap found in the prior art. Because the deformable body is completely insulated from the fluid stream by the thin film, the choice of material for the deformable body is not limited by the type of fluid being controlled.

Finally, because high sealing performance can be obtained with relatively low surface pressure between closure parts, the size of the drive unit 5 may be reduced.

The foregoing advantages are obtained with a sealing arrangement which can be manufactured at low cost and can be adapted by proper choice of materials for use at high temperatures.

While preferred embodiments of the invention have been described in specific detail, it will be recognized by those skilled in the art that various modifications and substitutions may be made in the described embodiments without departing from the spirit and scope of the invention as defined by the appended claims. For example, while welding is a preferred method of securing the thin film to a closure part, the thin film may also be secured by brazing, adhesion or pressure welding and caulking.

We claim:

1. A fluid flow controller assembly comprising a valve body having formed therein a recess and first and second passages connecting with said recess, a valve cover, a valve seat, a valve nut for tightening said valve cover onto said valve body, and a valve stem movably mounted in said valve cover and carrying a seal comprising a metallic film backed by a resiliently deformable body, said metallic film contacting said valve seat to selectively block the flow of a fluid between said passages, said assembly being characterized in that said metallic film comprises a rim portion clamped between said valve cover and said valve body whereby said metallic film and a valve body portion bounding said recess form a sealed valve chamber.

2. A fluid flow controller assembly as claimed in claim 1 wherein said metallic film further comprises a recessed portion for receiving an end of said valve stem, said resiliently deformable body being disposed between said metallic film and said end of said valve stem.

3. A fluid flow controller assembly as claimed in claim 1 wherein said metallic film comprises a generally cylindrical portion having an open end for receiving an end of said valve stem, said rim portion extending radially outwardly from said open end.

4. A fluid flow controller assembly as claimed in claim 3 wherein said generally cylindrical portion has a closed end having a circular ridge extending outwardly therefrom toward said valve seat.

5. A fluid flow controller assembly as claimed in claim 1 including means for mounting said valve stem for sliding movement in said valve cover toward and away from said valve seat.

6. A fluid flow controller assembly as claimed in claim 1 wherein said resiliently deformable body comprises a fluoro-rubber.

7. A fluid flow controller assembly as claimed in claim 1 wherein said resiliently deformable body comprises synthetic resin.

8. A fluid flow controller assembly as claimed in claim 1 wherein said metallic film comprises a nickel alloy.

9. A fluid flow control assembly as claimed in claim 1 wherein said metallic film comprises nickel.

10. A fluid flow control assembly as claimed in claim 1 wherein said metallic film comprises an electrodeposited material.

* * * * *